(12) United States Patent
Pahlke et al.

(10) Patent No.: US 10,766,532 B2
(45) Date of Patent: Sep. 8, 2020

(54) METHOD FOR ASSISTING A DRIVER TO KEEP IN A LANE

(71) Applicant: Ford Global Technologies, LLC, Dearborn, MI (US)

(72) Inventors: Dominik Pahlke, Cologne (DE); Michael Koherr, Euskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 16/120,492

(22) Filed: Sep. 4, 2018

(65) Prior Publication Data
US 2019/0092391 A1    Mar. 28, 2019

(30) Foreign Application Priority Data
Sep. 26, 2017    (DE) .......................... 10 2017 217 091

(51) Int. Cl.
| | | |
|---|---|---|
| *B62D 15/02* | (2006.01) | |
| *B60Q 1/04* | (2006.01) | |
| *B60Q 1/24* | (2006.01) | |
| *G06K 9/00* | (2006.01) | |

(52) U.S. Cl.
CPC ............ *B62D 15/029* (2013.01); *B60Q 1/04* (2013.01); *B60Q 1/24* (2013.01); *G06K 9/00798* (2013.01)

(58) Field of Classification Search
CPC .... B62D 15/029; G06K 9/00798; B60Q 1/24; B60Q 1/04; B60Q 2300/45; B60Q 1/085; B60Q 2300/32; B60W 30/12
See application file for complete search history.

(56) References Cited

U.S. PATENT DOCUMENTS

2018/0297470 A1*   10/2018   Kim ..................... B60K 35/00

FOREIGN PATENT DOCUMENTS

| DE | 102004048013 A1 | 4/2006 |
| DE | 102013222467 A1 | 5/2015 |
| DE | 102016006919 A1 | 2/2017 |

\* cited by examiner

*Primary Examiner* — Michael V Kerrigan
(74) *Attorney, Agent, or Firm* — David Coppiellie; Price Heneveld LLP

(57) ABSTRACT

A method is described for assisting a driver when operating a vehicle on a road having a road surface and lane markings. The method includes the steps of ascertaining position of lane markings using an ascertaining apparatus, determining at least one lane delimiting line on the ascertained position of the lane markings, specifying a trajectory of the vehicle, in the event of the trajectory that is specified intersecting a lane delimiting line that is determined, outputting an instruction to the driver of the vehicle using at least one light beam that is projected onto the road surface.

17 Claims, 4 Drawing Sheets

METHOD FOR ASSISTING A DRIVER TO KEEP IN A LANE

FIELD OF THE INVENTION

The present invention generally relates to vehicle driver assistance, and more particularly relates to a method and an apparatus for assisting a driver when operating a vehicle on a road having lane markings.

BACKGROUND OF THE INVENTION

The procedure of driving vehicles, in particular motor vehicles, on narrow streets represents a challenge for many drivers since it can be difficult in certain circumstances to keep in lane on narrow streets or roads. This places increased demands on the driver and demands maximum attention from the driver, in particular during nighttime or weather conditions with poor visibility. Some existing lane keeping systems assist the driver in keeping in lane by way of example by use of a vibration of the steering wheel or the lane keeping systems themselves actively engage in the steering. Many drivers find these solutions uncomfortable or unpleasant and therefore frequently deactivate the solutions when driving.

One approach disclosed in document DE 10 2016 006 919 A1 describes a method for operating a vehicle, wherein road markings are identified on the basis of ascertained data relating to the surrounding area. Dimensions and a course of the lane are determined and a virtual lane marking is projected onto the lane so as to visually delimit the lane. It would be desirable to provide an advantageous method for assisting a driver when operating a vehicle, and also to provide a driver assist apparatus for a vehicle and a vehicle that is fitted with such an apparatus.

SUMMARY OF THE INVENTION

According to an aspect of the present disclosure, a method for assisting a driver when operating a vehicle is provided. The method includes the steps of ascertaining position of the lane markings on a road using an ascertaining apparatus, determining a lane delimiting line based on the position of the lane markings, specifying a trajectory of the vehicle and if the trajectory intersects the lane delimiting line, outputting an instruction to the driver of the vehicle using at least one light beam projected onto a road surface.

According to another aspect of the present disclosure, a driver assist apparatus for a vehicle is provided. The apparatus includes an ascertaining apparatus ascertaining position of lane markings on a road surface, a controller determining a lane delimiting line based on the position of the lane markings, specifying a trajectory of the vehicle, and establishing whether the trajectory intersects the lane delimiting line, and a light source projecting a light beam onto the road surface to provide an instruction to a driver of the vehicle if the trajectory intersects the lane delimiting line.

According to yet a further aspect of the present disclosure a vehicle is provided. The vehicle includes an ascertaining apparatus ascertaining position of lane markings on a road surface, a controller determining a lane delimiting line based on the position of the lane markings, specifying a vehicle trajectory, and establishing whether the trajectory intersects the lane delimiting line, and a light source projecting a light beam onto the road surface as an instruction to a driver of the vehicle if the specified trajectory intersects a determined lane delimiting line.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
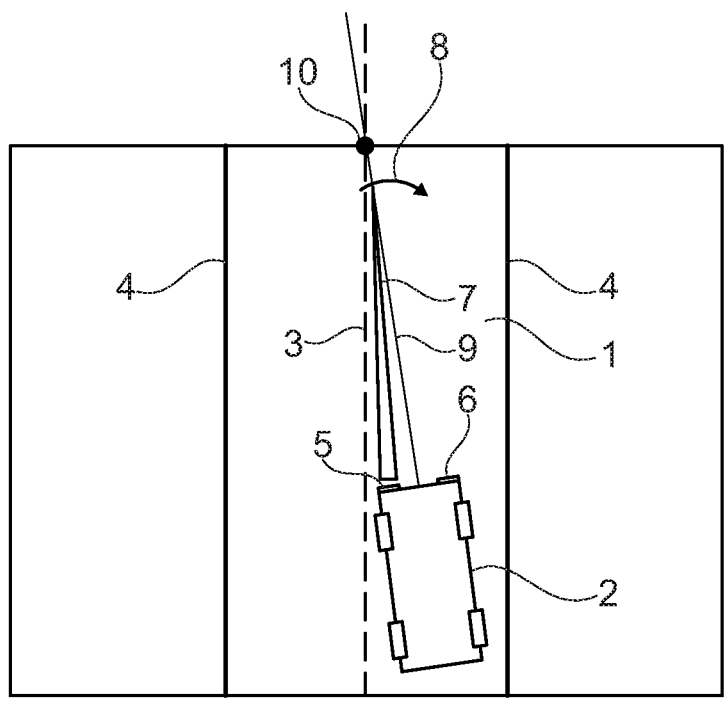
FIG. 1 is a schematic diagram illustrating in a plan view a vehicle traveling on a road while using the method and apparatus, according to a first embodiment.
Figure 2:
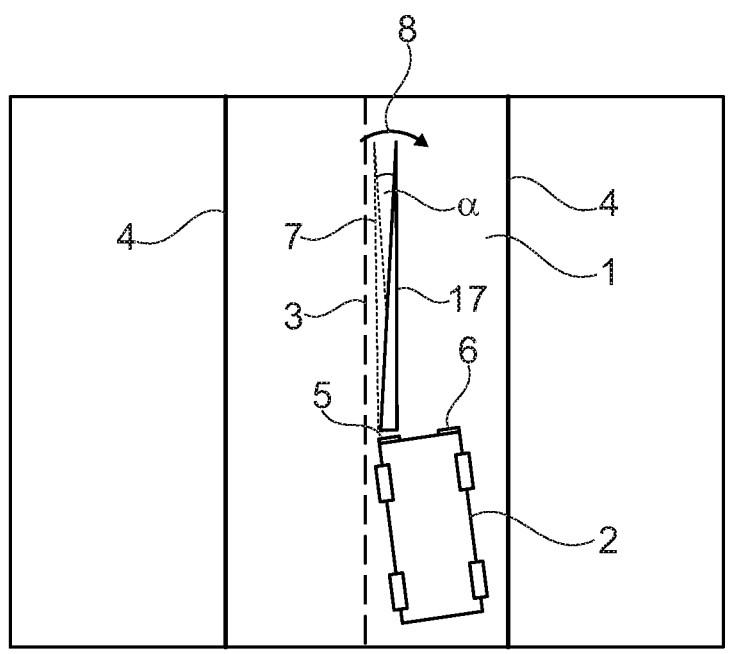
FIG. 2 is a schematic diagram further illustrating in a plan view the vehicle in FIG. 1 while using the method and apparatus.

A first embodiment variant of the method in accordance with one embodiment is further explained below with reference to FIGS. 1 and 2. FIGS. 1 and 2 illustrate schematically in a plan view a road 1 having a vehicle 2 that is moving forward on the road. The road 1 in the illustrated embodiment is a two-lane road having a dashed center line 3 and continuous edge markings 4. The road may have more lanes with multiple dashed lines delimiting or dividing the lanes.

The illustrated vehicle 2 in the present embodiment is a motor vehicle, and by way of a specific example is a passenger car or a truck. The vehicle 2 comprises a left-hand front headlight 5 and a right-hand front headlight 6 both located at or near the front end of the vehicle for illustrating light forward of the vehicle. The light beam or cone of light that is projected onto the road surface forward of the vehicle 2 by the left-hand front headlight 5 is identified by the reference numeral 7.

Within the scope of the method in accordance with one embodiment, the position of lane markings 3 and 4 is ascertained by use of an ascertaining apparatus, for example a camera or multiple cameras. At least one lane delimiting line is determined on the basis of the ascertained position of the lane markings 3 and 4. This lane delimiting line extends in the present embodiment on the center line 3.

Furthermore, a trajectory 9 of the vehicle 2 is specified. This may take place on the basis of the prevailing or current vehicle direction and vehicle speed. It may be preferred that within the scope of the method the steering direction 8 which is required so as to avoid driving over a point 10 at which the trajectory 9 intersects with the lane delimiting line 3 that is determined and/or a steering angle α that is required therefore may be set.

In the event that the trajectory 9 that is specified intersects a lane delimiting line 3 that is determined, as is the case in the present embodiment at point 10, an instruction is output to the driver of the vehicle 2 by at least one light beam 7 that is projected onto the road surface. This is performed in the present embodiment by a sweeping movement of the light beam 7 performed in the direction of the arrow 8. In FIG. 2, the light beam 7 during or at the end of the sweeping movement is identified by the reference numeral 17.

In one embodiment, the sweeping movement is performed in the direction of the steering movement that is to be implemented, as illustrated in the direction 8. Alternatively or in addition thereto, the required steering angle may be displayed by the sweeping movement. In other words, the light beam 7 may move through an angle α corresponding to the required steering angle. The movement may be performed back and forth or may only be performed in one direction so as to display the required steering direction.

Figure 3:
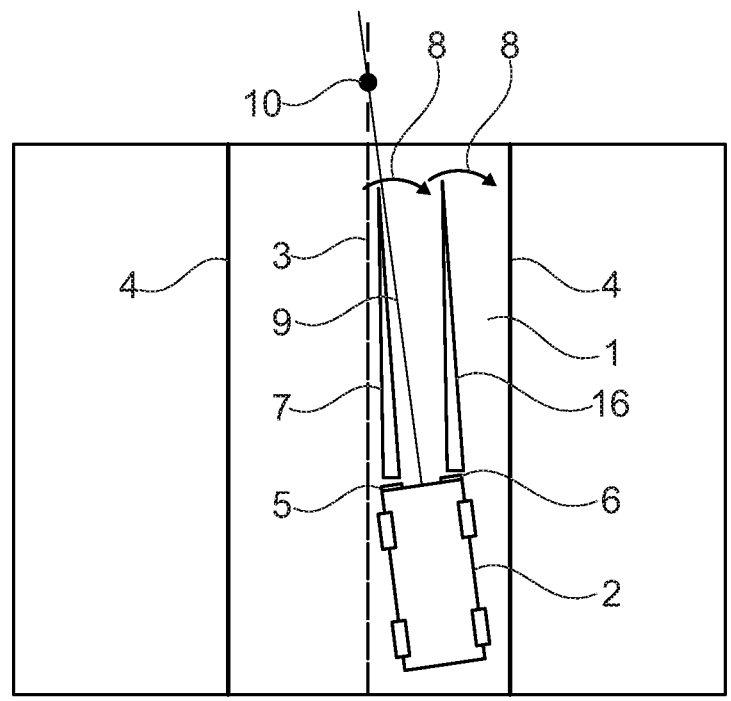
FIG. 3 is a schematic diagram illustrating in a plan view a vehicle traveling on a road while using the method and apparatus, according to a second embodiment.
Figure 4:
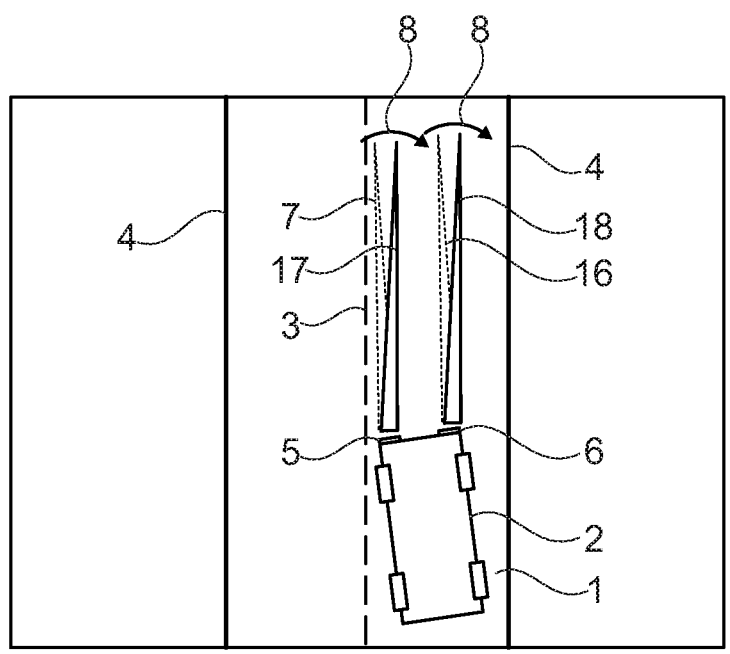
FIG. 4 is a schematic diagram further illustrating in a plan view the vehicle in FIG. 3 while using the method and apparatus.

In the first embodiment that is illustrated in FIGS. 1 and 2, only one headlight or generally only one light source is used so as to output an instruction to the driver. In the second embodiment variant that is illustrated in FIGS. 3 and 4, the two front headlights 5 and 6 or two light sources are used in a similar manner to the example that is illustrated in FIGS. 1 and 2 so as to output an instruction to the driver. The light beam that is output by the right-hand headlight 6 and projected onto the road surface is identified by the reference numerals 16 and 18. In FIGS. 3 and 4, the sweeping movement of the light beams of the two headlights 5 and 6 may be performed simultaneously or consecutively or in a delayed manner. A sweeping movement that is performed consecutively or in a delayed manner intensifies where appropriate the instruction function and attracts the attention of the driver in a particularly effective manner.

Figure 5:
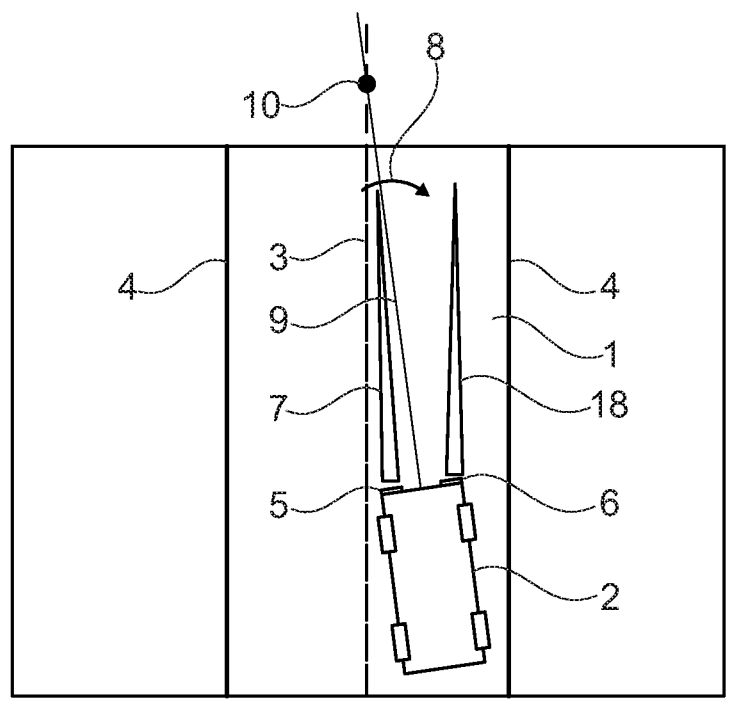
FIG. 5 is a schematic diagram illustrating in a plan view a vehicle traveling on a road while using the method and apparatus, according to a third embodiment.
Figure 6:
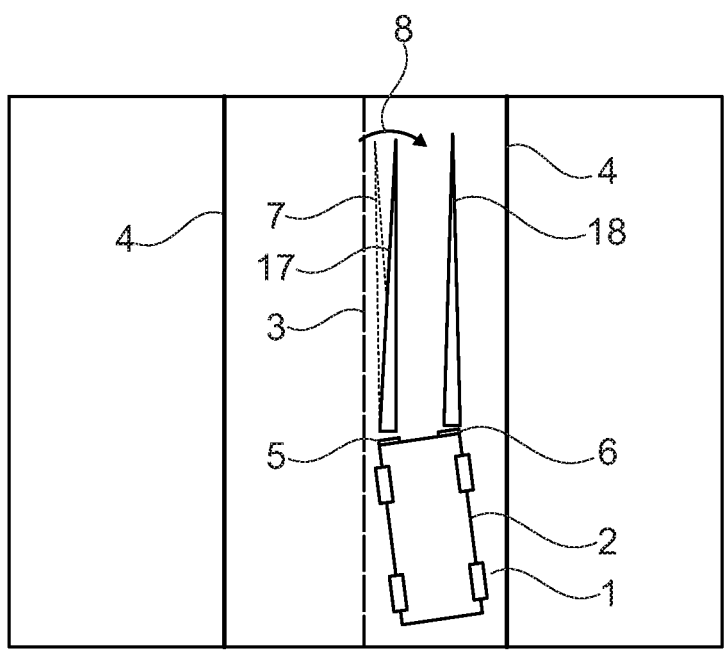
FIG. 6 is a schematic diagram further illustrating in a plan view the vehicle in FIG. 5 while using the method and apparatus.

In the third embodiment that is illustrated in the FIGS. 5 and 6, a headlight, in the present example the left-hand front headlight 5, is used in a manner similar to the first embodiment variant to output an instruction in the form of a sweeping movement while the second headlight or a second light source, in the present embodiment the right-hand front headlight 6, outputs by use of the light beam 18 an instruction to the driver in the form of a static display of the direction that is to be taken of the vehicle 2. In other words, the direction of travel that is to be taken is displayed to the driver by use of one of the headlights or a light source 6, while the extent and the direction, in other words the steering angle α, is displayed by a sweeping movement of the projected light beam 7 or 17 using a second light source or the second headlight 5.

Figure 7:
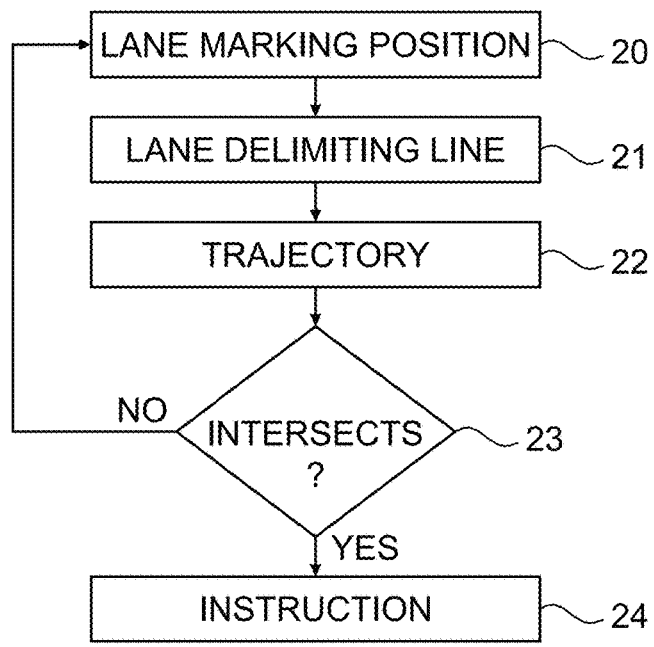
FIG. 7 is a flow diagram illustrating an exemplary embodiment of the method in accordance with one embodiment.

The method in accordance with one embodiment is explained below with reference to FIG. 7 in general in the form of a flow diagram. In step 20, the position of lane markings is ascertained by use of at least one ascertaining apparatus, by way of example, a camera. In step 21, at least one lane delimiting line is determined on the basis of the ascertained position of the lane markings. The trajectory of the vehicle is specified in step 22. Fundamentally, the step 22 may also be performed prior to the steps 20 and 21 or it may occur simultaneously thereto. In step 23, a check or a query is performed as to whether the trajectory that is specified intersects a lane delimiting line that is determined. If the response is no, the method is continued at step 20 or step 22. If the response is yes, in step 24 an instruction is output to the driver of the vehicle by use of at least one light beam that is projected onto the road surface.

Figure 8:
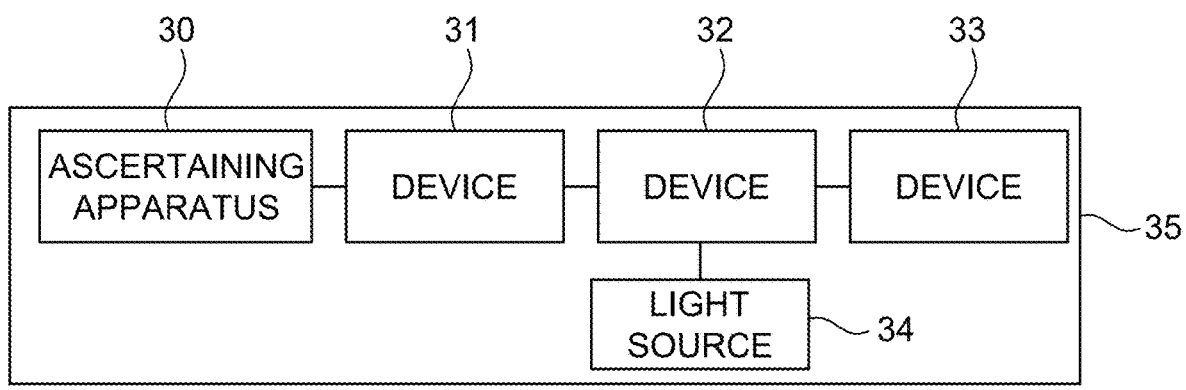
FIG. 8 is a schematic block diagram illustrating an apparatus in accordance with one embodiment.

FIG. 8 illustrates schematically a driver assist apparatus 35 in accordance with one embodiment for implementing the method. The apparatus 35 comprises at least one ascertaining apparatus 30 for ascertaining the position of lane markings, in other words for performing step 20 of FIG. 7, at least one device for determining at least one lane delimiting line on the basis of the ascertained position of the lane markings 31, in other words to perform the step 21. Furthermore, the apparatus 35 comprises a device 32 for specifying the trajectory of the vehicle, in other words for performing step 22 of FIG. 7. Moreover, the apparatus 35 comprises a device for establishing whether the specific trajectory intersects 33 a determined lane delimiting line in a definable distance and/or time, in other words an apparatus for performing the step 23 of FIG. 7. Furthermore, the apparatus 35 comprises at least one light source 34 for projecting at least one light beam onto the road surface, in other words for performing the step 24 in FIG. 7. The apparatus 35 may employ a controller such as a microprocessor or other analog and/or digital circuitry that serves to provide the functions of the device for determining at least one lane delimiting line on the basis of the ascertained position of the lane markings of step 21, the device 32 for specifying the trajectory of the vehicle for performing step 22, and the device for establishing whether the specific trajectory intersects 33 a lane delimiting line that is determined as found in step 23. The intersection may occur in a defined distance and/or time. Thus, the controller may include one or more devices integrated therein for performing the aforementioned functions set forth in steps 21, 22, and 23.

Figure 9:
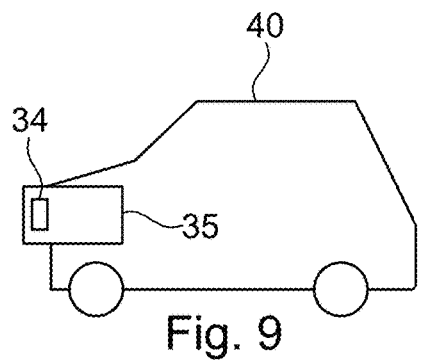
FIG. 9 is a schematic diagram of a vehicle having the apparatus and method, in accordance with one embodiment.

FIG. 9 illustrates schematically a vehicle having the apparatus and method in accordance with one embodiment, by way of example a motor vehicle, in particular a passenger car, a truck or a motorbike. The vehicle 40 comprises the apparatus 35. In the illustrated embodiment, the light source 34 is a headlight that is already provided, by way of example a front headlight or a fog light.

The method in accordance with one embodiment for assisting a driver when operating a vehicle on a road having a road surface and lane markings comprises the following steps. The position of lane markings is ascertained by use of at least one ascertaining apparatus. At least one lane delimiting line is determined on the basis of the ascertained position of the lane markings. A trajectory of the vehicle is specified. The trajectory of the vehicle may include the trajectory of the vehicle boundary closest to the lane delimiting line so that the intersection of the closest part of the vehicle crossing the delimiting line is calculated. This may preferably be a predicted vehicle trajectory based on the current movement of the vehicle. In the event of the trajectory that is specified intersecting a lane delimiting line that is determined, an instruction is output to the driver of the vehicle by use of at least one light beam that is projected or directed onto the road surface.

In comparison with the above-described known driver assist systems, the method in accordance with the embodiment disclosed has the advantage that by virtue of only providing a visual instruction to the driver, it is not necessary to provide vibrations of the steering wheel that are found to be unpleasant or to actively engage in the steering. Furthermore, the attention of the driver is diverted onto the road surface and therefore in the direction of travel by use of the instructions that are projected in the form of light beams onto the road surface. The driver is therefore not distracted by use of haptic or acoustic signals.

In one specific embodiment, the ascertaining apparatus is preferably a camera. In other words, the position of lane markings may preferably be ascertained by use of a camera. Fundamentally, one or multiple cameras may be used. It is likewise possible to provide and to use multiple different ascertaining apparatuses. In particular in the case of conditions that are not optically favorable, alternative ascertaining apparatuses are available, such as by way of example one or multiple ultrasound apparatuses, laser apparatuses or other apparatuses. The use of a camera has the advantage that cameras are particularly suited in particular to narrow streets or highways owing to the fact that lane markings on the streets or highways are frequently applied to the road surface in the form of stripes of contrasting color and the stripes may be best ascertained using an optical device.

In an advantageous variant, within the scope of the method in accordance with one embodiment, a steering direction of the vehicle is set so as to avoid driving over a point that is determined at which the trajectory intersects with a determined lane delimiting line in a definable distance and/or time. In other words, the steering direction that is required so as to keep to the lane is set. This has the advantage that the driver may be specifically instructed regarding the steering movement or steering direction that is to be implemented.

In one embodiment, the steering direction that is set may be transmitted to the driver, in particular may be displayed to the driver. This may be performed by way of example by use of the at least one light beam that is projected onto the road surface. The steering direction that is set may be visually displayed in any suitable form. This may in particular be performed by a movement of the projected light beam, by use of the form of the light beam or by an intensity curve of the beam or cone of light that is projected onto the road surface or of the projected image. For example, the projected light beam or a projected image may point in the steering direction that is to be taken and, as a consequence, make the steering angle distinguishable. The projection of the light beam may project one or more symbols with sweeping movement, or a dynamic symbol such as a straight line which may bend to indicate a required steering maneuver to correct the path.

The step of determining or setting and displaying the steering angle has the advantage that the driver is precisely directed to the required steering maneuver, namely also with regard to the extent of the required steering movement. As a consequence, an unnecessary oversteer or steering procedure that is too intense or snaking movements are avoided.

In a particularly preferred embodiment, the instruction is output in the form of a sweeping movement of the light beam that is projected or directed onto the road surface. The light beam or cone of light may sweep along the road surface by way of example starting from the current direction of travel in the direction of the steering angle that is set and/or through a steering angle that corresponds to the steering angle that is set to indicate to the driver an instruction for the steering direction or steering angle to avoid driving over a point of the intersection of the trajectory with the delimiting line. The sweeping movement has the advantage that in this manner a dynamic signal is generated or a dynamic instruction is issued that attracts the attention of the driver. In contrast, a purely static projection attracts the attention of the driver to a lesser extent.

The light beam may comprise for example a cone of light having a center axis. The point at which the center axis intersects with the road surface may perform a rotational movement on the road surface. It may preferably perform a rotational movement in the direction of the steering direction that is set and/or through the steering angle that is set.

According to one embodiment, the vehicle that is used preferably comprises at least one headlight. This may be a headlight that is already provided, by way of example a front headlight that is usually provided, or a fog light. The at least one light beam may in this case be generated by the at least one headlight. This has the advantage that an additional light source is not required and light sources that are already provided may also be used efficiently so as to implement the method in accordance with the disclosed embodiment.

In a further embodiment, an instruction is output to the driver of the vehicle by use of two light beams that are projected or directed onto the road surface. For example, the two light beams that are used may perform an identical movement, by way of example an above-described sweeping movement, on the road surface. This may be performed simultaneously or consecutively in dependence upon the steering direction that is set. By way of example, the two front headlights may simultaneously or consecutively perform a sweeping movement starting from the current direction of travel through the steering angle that is set and/or into the steering direction that is set. This draws the attention of the driver in a manner that the driver does not find to be unpleasant or disturbing and simultaneously suggests to the driver the steering action that is to be taken.

The driver assist apparatus for assisting a driver when operating a vehicle comprises at least one ascertaining apparatus for ascertaining the position of lane markings, and a controller that may provide the function of a device for determining at least one lane delimiting line on the basis of the ascertained position of the lane markings, a device for specifying the trajectory of the vehicle, and a device for establishing whether the trajectory that is specified intersects a lane delimiting line that is determined. The apparatus also has at least one light source for projecting a light beam onto the road surface. The apparatus is configured so as to implement the previously described method. The apparatus in accordance with the invention fundamentally comprises the same characteristics and advantages as the already described method. In particular, the ascertaining apparatus may comprise at least one camera or another apparatus already mentioned above.

The vehicle may comprise the described driver assist apparatus. The vehicle may be for example a motor vehicle, in particular a passenger car, a truck or a motorbike. The motor vehicle in accordance with the invention comprises the same characteristics and advantages as the already described apparatus and the method described above.

Further features, characteristics and advantages of the present disclosure are described herein with the aid of exemplary embodiments with reference to the attached figures. All the features that have been described herein are advantageous both individually as well as in an arbitrary combination with one another. The exemplary embodiments described herein only represent examples that however do not limit the subject matter of the invention.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for assisting a driver when operating a vehicle, comprising:
   ascertaining positions of lane markings on a road using an ascertaining apparatus;
   determining a lane delimiting line based on the position of the lane markings;
   specifying a trajectory of the vehicle; and
   if the trajectory intersects the lane delimiting line, outputting an instruction to the driver of the vehicle using at least one light beam generated by at least one headlight of the vehicle projected onto a surface of the road, wherein the instruction is output in the form of a sweeping movement of the at least one light beam that is projected onto the surface of the road.

2. The method as claimed in claim 1, wherein the ascertaining apparatus comprises a camera.

3. The method as claimed in claim 1, wherein the instruction indicates a steering direction for the vehicle to avoid driving over a point that is determined at which the trajectory intersects with the lane delimiting line.

4. The method as claimed in claim 1, wherein the instruction indicates a steering angle for the vehicle to avoid driving over a point that is determined at which the trajectory intersects with the lane delimiting line.

5. The method as claimed in claim 1, wherein the at least one light beam comprises a cone of light having a center axis and a point at which the center axis intersects with the surface of the road, wherein the point performs a rotational movement on the surface of the road.

6. The method as claimed in claim 1, wherein the instruction is output to the driver of the vehicle by two light beams that are projected onto the surface of the road.

7. A driver assist apparatus for a vehicle, comprising:
   an ascertaining apparatus ascertaining positions of lane markings on a road surface;
   a controller determining a lane delimiting line based on the position of the lane markings, specifying a trajectory of the vehicle, and establishing whether the trajectory intersects the lane delimiting line; and
   a headlight of the vehicle comprising a light source projecting a light beam onto the road surface to provide an instruction to a driver of the vehicle if the trajectory intersects the lane delimiting line, wherein the instruction is output in the form of a sweeping movement of the light beam that is projected onto the road surface.

8. The apparatus as claimed in claim 7, wherein the ascertaining apparatus comprises at least one camera.

9. The apparatus as claimed in claim 7, wherein the instruction indicates a steering direction for the vehicle to avoid driving over a point that is determined at which the trajectory intersects with the lane delimiting line.

10. The apparatus as claimed in claim 7, wherein the instruction indicates a steering angle for the vehicle to avoid driving over a point that is determined at which the trajectory intersects with the lane delimiting line.

11. The apparatus as claimed in claim 7, wherein the light beam comprises a cone of light having a center axis and a point at which the center axis intersects with the road surface, wherein the point performs a rotational movement on the road surface.

12. The apparatus as claimed in claim 7, wherein the light beam is generated by the at least one headlight.

13. The apparatus as claimed in claim 7, wherein the instruction is output to the driver of the vehicle by two light beams that are projected onto the road surface.

14. The apparatus as claimed in claim 7, wherein the controller comprises a first device for determining the lane delimiting line, a second device for specifying the trajectory of the vehicle, and a third device for establishing whether the trajectory intersects the lane delimiting line.

15. A vehicle comprising:
   an ascertaining apparatus ascertaining positions of lane markings on a road surface;
   a controller determining a lane delimiting line based on the position of the lane markings, specifying a vehicle trajectory, and establishing whether the trajectory intersects the lane delimiting line; and
   at least one headlight of the vehicle comprising a light source projecting a light beam onto the road surface as an instruction to a driver of the vehicle if the specified trajectory intersects the determined lane delimiting line, wherein the instruction is output in the form of a sweeping movement of the light beam that is projected onto the road surface.

16. The vehicle of claim 15, wherein the ascertaining apparatus comprises at least one camera.

17. The vehicle of claim 15, wherein the light beam is generated by the at least one headlight.

* * * * *